United States Patent
Doerr et al.

(10) Patent No.: US 9,308,876 B2
(45) Date of Patent: Apr. 12, 2016

(54) METHODS FOR GENERATING AN ITEM OF INFORMATION FOR INDICATING AN AIRBORNE STATE FOR A VEHICLE AND METHOD FOR DETECTING AN AIRBORNE STATE OF A VEHICLE

(71) Applicants: Alfons Doerr, Stuttgart (DE); Christian Korn, Stuttgart (DE); Hansjoerg Markus Hild, Friolzheim (DE); Olaf Koerner, Hamburg (DE); Stephan Rittler, Urbach (DE)

(72) Inventors: Alfons Doerr, Stuttgart (DE); Christian Korn, Stuttgart (DE); Hansjoerg Markus Hild, Friolzheim (DE); Olaf Koerner, Hamburg (DE); Stephan Rittler, Urbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/352,927

(22) PCT Filed: Oct. 12, 2012

(86) PCT No.: PCT/EP2012/070240
§ 371 (c)(1),
(2) Date: Apr. 18, 2014

(87) PCT Pub. No.: WO2013/057042
PCT Pub. Date: Apr. 25, 2013

(65) Prior Publication Data
US 2015/0039155 A1    Feb. 5, 2015

(51) Int. Cl.
*B60R 16/023* (2006.01)
*B60K 28/14* (2006.01)
*B60W 40/10* (2012.01)
*B60R 21/00* (2006.01)

(52) U.S. Cl.
CPC ............... *B60R 16/023* (2013.01); *B60K 28/14* (2013.01); *B60R 16/0233* (2013.01); *B60R 21/00* (2013.01); *B60W 40/10* (2013.01); *B60R 2021/0002* (2013.01); *B60W 2520/105* (2013.01); *B60W 2520/28* (2013.01)

(58) Field of Classification Search
CPC .. B60R 16/0233; B60R 16/023; B60R 21/00; B60R 2021/0002; B60K 28/14; B60W 40/10; B60W 2520/28; B60W 2520/105
USPC .......................................................... 701/1
See application file for complete search history.

(56) References Cited

U.S. PATENT DOCUMENTS

| | | | |
|---|---|---|---|
| 6,052,634 A * | 4/2000 | Pathe et al. ..................... 701/45 |
| 2009/0025996 A1* | 1/2009 | Inoue et al. .................. 180/179 |
| 2011/0153174 A1* | 6/2011 | Roberge et al. ................ 701/58 |

FOREIGN PATENT DOCUMENTS

| | | |
|---|---|---|
| DE | 19751925 | 5/1999 |
| DE | 19904216 | 1/2000 |

(Continued)

OTHER PUBLICATIONS

International Search Report for PCT/EP2012/070240, issued on Jan. 4, 2013.

*Primary Examiner* — Rodney Butler
(74) *Attorney, Agent, or Firm* — Kenyon & Kenyon LLP

(57) ABSTRACT

A method is described for generating an item of information for indicating an airborne state for a vehicle. The method has a step of receiving a rotational speed signal which represents a rotational speed of at least one drive wheel of the vehicle. The method also has a step of generating the information for indicating an airborne state based on a comparison of a profile of the rotational speed signal with at least one reference profile for the rotational speed signal.

20 Claims, 3 Drawing Sheets

(56) References Cited

FOREIGN PATENT DOCUMENTS

| | | |
|---|---|---|
| DE | 102 04 128 | 8/2003 |
| DE | 10235567 | 2/2004 |
| DE | 10 2007 001 714 | 8/2007 |
| DE | 10 2007 005 123 | 9/2007 |
| DE | 60 2004 013 303 | 5/2009 |
| DE | 10 2011 079 244 | 1/2013 |
| EP | 2289753 | 3/2011 |
| WO | WO2005/082680 | 9/2005 |

* cited by examiner

METHODS FOR GENERATING AN ITEM OF INFORMATION FOR INDICATING AN AIRBORNE STATE FOR A VEHICLE AND METHOD FOR DETECTING AN AIRBORNE STATE OF A VEHICLE

FIELD OF THE INVENTION

The present invention relates to methods for generating an item of information for indicating an airborne state for a vehicle, a method for detecting an airborne state of a vehicle, a corresponding device, and a corresponding computer program product.

BACKGROUND INFORMATION

The activation of a restraining system in a vehicle collision is in principle determined by the collision type or crash type and the collision severity or crash severity. It is known that both the crash type and the crash severity to be expected are assessed via the combined signal evaluation of acceleration sensors, roll rate sensors, and pressure sensors, as well as anticipatory sensors, for example, radar, which are integrated into a vehicle. The signal profiles and the change in speed in the longitudinal and lateral directions are evaluated via the acceleration sensors; the continuation of a vehicle rollover movement about the longitudinal axis is evaluated via the roll rate; two-dimensional collision contacts are detected via the pressure sensors; and a collision speed and a collision overlap are detected essentially via anticipatory sensors. It is also known that evaluation algorithms as well as the sensor configuration are designed and applied based on standardized crash tests.

In European Published Patent Appln. No. 2 289 753, acceleration signals in the x, y, and z directions are used for detecting an airborne state.

German Published Patent Appln. No. 102 35 567 discloses a device for detecting a rollover event.

SUMMARY

Against this background, the present invention provides methods for generating an item of information for indicating an airborne state for a vehicle, a method for detecting an airborne state of a vehicle, a device which uses at least one of these methods, and finally, a corresponding computer program product as recited in the main claims. Advantageous embodiments result from the respective subclaims and the following description.

In principle, it is possible to distinguish between time-critical and non-time-critical restraining systems. While conventional front and side airbags provide a protective effect for only a small fraction of a second after their activation, a restraining system including pyrotechnic seat belt tensioners and cold curtain airbags may deploy a protective effect significantly longer, i.e., if necessary, up to several minutes. The type of restraining system activated in the event of a crash is a function of the crash type and the crash severity. In the event of a crash, time-critical and non-time-critical restraining systems are generally activated within a very small time window by the triggering functions of the safety electronics. The time-based coupling of the activation of time-critical and non-time-critical restraining systems is expedient, but not mandatory, for a variety of simple crash scenarios. In this context, the so-called airborne situation is an important situation. In such a situation, it is not possible for the driver to influence the effects of the landing in the airborne state, since both braking and steering remain ineffective. The severity of the landing and the associated injuries thus depend solely on physical laws and surrounding conditions. Therefore, it is important to initiate necessary passive restraint system measures before the landing or to achieve the best possible triggering during the landing.

Generation of an item of information for indicating an airborne state and consequently detection of an airborne state of a vehicle may be carried out using sensor data, for example, based on at least one measured variable which is different from vehicle acceleration values. An airborne state detected in this way may, for example, be used for triggering occupant safety devices or a restraining system of a vehicle.

One advantage of the present invention is that early, robust, and reliable detection of an airborne situation of a vehicle is made possible. Driving safety may thus be increased and the consequences of an accident for vehicle occupants may be reduced, since the airborne state of the vehicle which is detected with the aid of specific embodiments of the present invention may be used in a suitable manner with respect to occupant protection devices.

The present invention creates a method for generating an item of information for indicating an airborne state for a vehicle, the method having the following steps:

receiving a rotational speed signal which represents a rotational speed of at least one drive wheel of the vehicle; and generating the information for indicating an airborne state based on a comparison of a profile of the rotational speed signal with at least one reference profile for the rotational speed signal.

The vehicle may be a motor vehicle, for example, a passenger car, a truck, or some other commercial vehicle. The vehicle may also be a motorcycle or generally a two-wheeler. The information for indicating an airborne state may represent an indication of the existence or non-existence of an airborne state of the vehicle. The airborne state refers to a state of the vehicle when it is airborne or a loss of contact of the vehicle with the road surface. The information for indicating an airborne state may have a first logical value which represents an indication of the existence of an airborne state of the vehicle. The information for indicating an airborne state may also have a second logical value which represents an indication of the non-existence of an airborne state of the vehicle. The profile of the rotational speed signal may represent a change in the rotational speed signal over time. A change or a gradient of the rotational speed, or a difference between rotational speeds at different points in time, may thus also be derived from the profile of the rotational speed signal. The at least one reference profile to which the rotational speed signal is compared may represent a setpoint profile or ideal profile during a normal operating state of the vehicle with road surface contact. A tolerance range of rotational speed values above and below the reference profile may be provided. If the profile of the rotational speed signal corresponds to the reference profile, for example, within the tolerance range, it may be concluded that no airborne state of the vehicle exists. If there is a deviation of the profile of the rotational speed signal from the at least one reference profile beyond the tolerance range, it may be concluded that an airborne state of the vehicle exists. In addition, a time criterion for the deviation may be provided. The information for indicating an airborne state including the indication of the existence of an airborne state may thus be generated in the event of a deviation of the profile from the reference profile, in which the deviation exceeds a predefined period of time. For example, a first reference profile which, for example, represents an upper threshold value for the profile of the rotational speed signal, and a second reference profile which, for example, represents a lower threshold value for the profile of the rotational speed signal, may also be provided. The at least one reference profile with which the rotational speed signal is compared may also correspondingly represent an airborne state of the vehicle if road contact is vanishing or if road contact does not exist. A tolerance range of rotational speed values above and below the reference profile may be provided. If the profile of the rotational speed signal corresponds to the reference profile, for example, within the tolerance range, it may be concluded that an airborne state of the vehicle exists.

The present invention also creates a method for generating an item of information for indicating an airborne state for a vehicle, the method having the following steps:

receiving a seat occupancy signal which represents a seat occupancy of at least one seat of the vehicle; and generating the information for indicating an airborne state based on a comparison of a profile of the seat occupancy signal with at least one reference profile for the seat occupancy signal.

The present invention furthermore creates a method for generating an item of information for indicating an airborne state for a vehicle, the method having the following steps:

receiving a tire load signal which represents a tire load of at least one tire of the vehicle; and generating the information for indicating an airborne state based on a comparison of a profile of the tire load signal with at least one reference profile for the tire load signal.

The present invention also creates a method for generating an item of information for indicating an airborne state for a vehicle, the method having the following steps:

receiving a shock absorber load signal which represents a shock absorber load of at least one shock absorber of the vehicle; and generating the information for indicating an airborne state based on a comparison of a profile of the shock absorber load signal with at least one reference profile for the shock absorber load signal.

It is thus possible to generate indications of an airborne state in a corresponding manner via an evaluation of a rotational speed signal, a seat occupancy signal, a tire load signal, or a shock absorber load signal. What these signals have in common is that they represent no accelerations of the vehicle.

The rotational speed signal may represent a rotational speed of an element of a drive train of the vehicle, for example, a drive wheel of the vehicle. The rotational speed signal may, for example, be received via an interface to a rotational speed sensor. With the aid of the rotational speed signal, a change in the rotational speed may thus be detected from a start of the airborne state and may be classified via comparison with the reference profile as an indication of an airborne state or as an indication of no airborne state. Alternatively or in addition to the rotational speed signal, a torque signal may be used in a corresponding manner which represents a torque which is transmitted via the drive train of the engine of the vehicle or to a drive wheel of the vehicle.

The seat occupancy signal may include an item of information about a detected occupancy of a seat of the vehicle. The seat occupancy signal may, for example, be received via an interface to a seat occupancy sensor. The seat occupancy sensor may be designed to detect the seat occupancy via a direct or indirect measurement of a weight force acting on the seat. With the aid of the seat occupancy signal, a change of the detected occupancy of the seat may thus be detected from a start of the airborne state and may be classified via comparison with the reference profile as an indication of an airborne state or as an indication of no airborne state.

The tire load signal may represent a load acting on a tire of the vehicle. The tire load signal may, for example, be received via an interface to a sensor situated in the tire, for example, a tire pressure sensor. With the aid of the tire load signal, a change in the tire load may thus be detected from a start of the airborne state and may be classified via comparison with the reference profile as an indication of an airborne state or as an indication of no airborne state.

The shock absorber load signal may represent a load acting on a shock absorber of the vehicle. The shock absorber load signal may, for example, be received via an interface to a sensor situated on the shock absorber of the vehicle, for example, a path sensor for detecting a downward spring deflection state of the shock absorber. With the aid of the shock absorber load signal, a change in the tire load may thus be detected from a start of the airborne state and may be classified via comparison with the reference profile as an indication of an airborne state or as an indication of no airborne state.

In addition, the present invention creates a method for detecting an airborne state of a vehicle, the method having the following steps:

reading in at least two items of information for indicating an airborne state which is generated according to at least two of the aforementioned methods; and combining a first item of information for indicating an airborne state which is generated according to one of the aforementioned methods with at least one second item of information for indicating an airborne state which is generated according to one of the aforementioned methods, in order to generate an airborne state signal which represents detection of the airborne state of the vehicle.

The airborne state signal may, for example, be generated in such a way that it has one of two logical values. A first logical value of the airborne state signal may represent the existence of an airborne state of the vehicle. A second logical value of the airborne state signal may represent the non-existence of an airborne state of the vehicle. In the step of combining, at least one mathematical operation may be carried out, for example, at least one logical link of the first item of information for indicating an airborne state and the second item of information for indicating an airborne state. If, for example, both the first and the at least one second item of information for indicating an airborne state indicate the existence of an airborne state of the vehicle, the airborne state signal may be generated in such a way that it has the first logical value, which represents the existence of an airborne state. If, for example, only one or none of the first and the at least one second items of information for indicating an airborne state indicates the existence of an airborne state of the vehicle, the airborne state signal may be generated in such a way that it has the second logical value, which represents the non-existence of an airborne state.

The reliable detection or classification of an airborne state may include a selection of the aforementioned information for indicating an airborne state or the entire selection of the information for indicating an airborne state. The individual items of information for indicating an airborne state may be suitably grouped and combined. This could then, for example, result in the omission or reduction of acceleration sensors for the detection of an airborne state. The determination that complex crash scenarios are due to a chronological chain of hazardous events is important with respect to the present invention. The detection of an airborne state of a vehicle is an essential element with respect to hazardous events. The reliable classification of an airborne state requires the selection of characteristic features or measured variables, on the basis of which meaningful information for indicating an airborne state may be generated. Instead of the vehicle accelerations and the yaw rates, a road friction moment, a weight signal of a seat occupancy sensor, load detection via tire pressure or via shock absorption, and a simultaneous change of multiple yaw rates may constitute advantageous measured variables for information for indicating an airborne state.

According to one specific embodiment, a step may be provided of receiving an additional item of information for indicating an airborne state which is based on a value from at least one acceleration sensor of the vehicle. A step may also be provided of combining the additional item of information for indicating an airborne state with the first item of information for indicating an airborne state and the at least one second item of information for indicating an airborne state, in order to generate the airborne state signal. Such a specific embodiment of the present invention provides the advantage that the reliability and certainty of detection of the airborne state may be increased by also including the additional item of information for indicating an airborne state.

According to one specific embodiment, a step may be provided of receiving an additional item of information for indicating an airborne state which is based on a value from at least one acceleration sensor of the vehicle. A step of carrying out a plausibility check of the airborne state signal may also be provided using the additional item of information for indicating an airborne state or vice-versa. A plausibility check of the airborne state signal may be carried out using the additional item of information for indicating an airborne state. Alternatively, a plausibility check of the additional item of information for indicating an airborne state may be carried out using the airborne state signal. Such a specific embodiment of the present invention provides the advantage that situations which are not an airborne state, but which are accompanied by similar acceleration signals, may be identified as misuses or misclassification using this plausibility check. The reliability and certainty of detection of the airborne state may thus be improved.

Furthermore, a step may be provided of outputting the airborne state signal to an interface to at least one occupant safety device. The at least one occupant safety device may have a restraint device, for example, a belt tensioner, an airbag, or the like, and, if necessary, a control unit for the restraint device. Such a specific embodiment of the present invention provides the advantage that the early, reliable detection of an airborne situation, if necessary, in combination with other driving situation elements, may enable an early activation, for example, of a non-time-critical restraining system. It is thus ensured that the occupants are secured in a timely manner in a position which is usable for a time-critical restraining system. Basic protection is thus ensured in the event of complex occupant movements which are extended over time, so that time-critical safety systems which act once are able to deploy their full protective effect. It is ensured that an appreciable risk of injury to the occupants is reliably detected in the vehicle movement over time, thus also making possible the early activation of an irreversible restraining system. The early activation of a non-time-critical restraining system is thus also possible in hazardous driving situations which, in complex crash sequences, may happen significantly ahead of the actual vehicle collision in which the time-critical restraining system is to be activated. The airborne state of a vehicle is an important element in a typical hazardous driving situation. A significantly earlier activation of the non-time-critical restraining system will not reduce their protective effect, but will instead usually increase it. This applies in particular if, as a result, occupant movement relative to the passenger compartment in complex driving scenarios may be inhibited before the actual vehicle collision, so that the protective effect of the time-critical restraining system is not impaired and the risk of injury is decreased.

The present invention furthermore provides a device which is designed to carry out or implement the steps of at least one of the methods in corresponding devices according to one of the specific embodiments described above. The object of the present invention may also be achieved quickly and efficiently via this embodiment variant of the present invention in the form of a device.

A device may presently be understood to be an electric device which processes sensor signals and outputs control and/or data signals as a function of them. The device may have an interface which may have a hardware-based and/or software-based design. In a hardware-based design, the interfaces may, for example, be part of a so-called system ASIC, which contains a wide variety of functions. However, it is also possible that the interfaces are self-contained integrated circuits or are made up at least partially of discrete components. In a software-based design, the interfaces may be software modules which, for example, are present on a microcontroller, in addition to other software modules.

Another advantage relates to a computer program product having program code which may be stored on a machine-readable medium such as a semiconductor memory, a hard-disk memory, or an optical memory, and which is used for carrying out at least one of the methods according to one of the specific embodiments described above, if the program is executed on a computer or a device.

DETAILED DESCRIPTION

Figure 1:
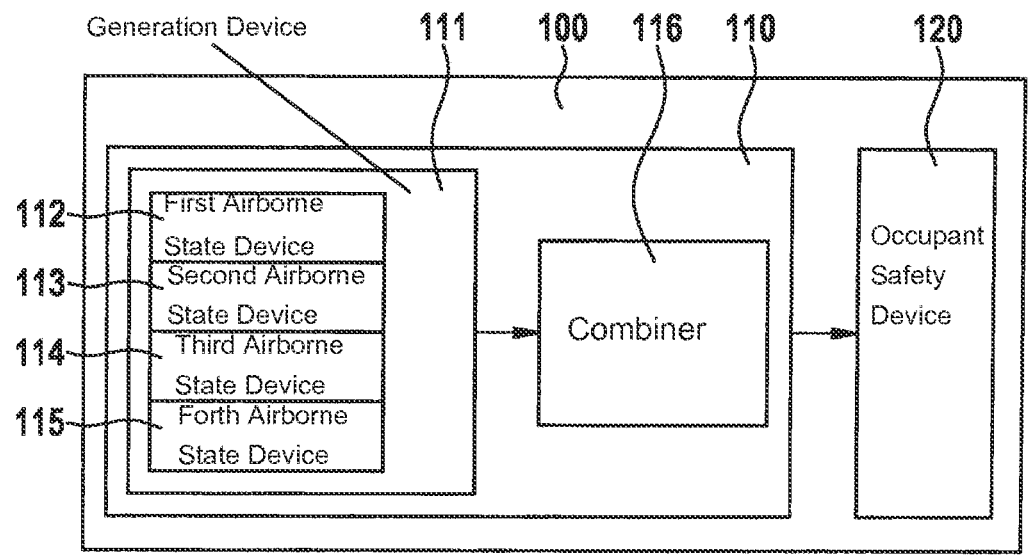
FIG. 1 shows a schematic block diagram of a vehicle having a device according to one exemplary embodiment of the present invention.

In the following description of preferred exemplary embodiments of the present invention, identical or similar reference numerals are used for the elements which are depicted in the various figures and act similarly, a repeated description of these elements being omitted.

FIG. 1 shows a schematic block diagram of a vehicle 100 having a device 110 according to one exemplary embodiment of the present invention. Device 110 is a device for generating information for indicating an airborne state and for detecting an airborne state of the vehicle. Vehicle 100 includes device 110, which has a generation device 111 for information for indicating an airborne state having, by way of example, a first device for indicating an airborne state 112, a second device for indicating an airborne state 113, a third device for indicating an airborne state 114, a fourth device for indicating an airborne state 115, and a combiner 116. Vehicle 100 furthermore includes an occupant safety device 120. Device 110 is connected to occupant safety device 120 via a communication interface. Generation device 111 for information for indicating an airborne state has, by way of example, first device for indicating an airborne state 112, second device for indicating an airborne state 113, third device for indicating an airborne state 114, and fourth device for indicating an airborne state 115. According to alternative exemplary embodiments of the present invention, generation device 111 may have at least two of the devices for indicating an airborne state 112, 113, 114, 115.

Generation device 111 or first device for indicating an airborne state 112 is designed to receive a rotational speed signal which represents a rotational speed of at least one drive wheel of the vehicle. First device for indicating an airborne state 112 is designed to generate an item of information for indicating an airborne state based on a comparison of a profile of the rotational speed signal with at least one reference profile for the rotational speed signal.

Generation device 111 or second device for indicating an airborne state 113 is designed to receive a seat occupancy signal which represents a seat occupancy of at least one seat of the vehicle. Second device for indicating an airborne state 113 is designed to generate an item of information for indicating an airborne state based on a comparison of a profile of the seat occupancy signal with at least one reference profile for the seat occupancy signal.

Generation device 111 or third device for indicating an airborne state 114 is designed to receive a tire load signal which represents a tire load of at least one tire of the vehicle. Third device for indicating an airborne state 114 is designed to generate an item of information for indicating an airborne state based on a comparison of a profile of the tire load signal with at least one reference profile for the tire load signal.

Generation device 111 or fourth device for indicating an airborne state 115 is designed to receive a shock absorber load signal which represents a shock absorber load of at least one shock absorber of the vehicle. Fourth device for indicating an airborne state 115 is designed to generate an item of information for indicating an airborne state based on a comparison of a profile of the shock absorber load signal with at least one reference profile for the shock absorber load signal.

Generation device 111 is designed to output the information for indicating an airborne state which is generated with the aid of at least two of the devices for indicating an airborne state 112, 113, 114, 115 to combiner 116.

Combiner 116 is designed to read in the at least two items of information for indicating an airborne state which are generated and received by generation device 111. Combiner 116 is also designed to combine a first item of information for indicating an airborne state which is generated with the aid of one of the devices for indicating an airborne state 112, 113, 114, 115 with at least one second item of information for indicating an airborne state which is generated with the aid of one of the devices for indicating an airborne state 112, 113, 114, 115, in order to generate the airborne state signal which represents detection of the airborne state of the vehicle. Combiner 116 is furthermore designed to output the generated airborne state signal to the communication interface to occupant safety device 120.

Occupant safety device 120 is designed to receive the airborne state signal which is generated and output with the aid of combiner 116 via the communication interface. Occupant safety device 120 may be designed to control a triggering of at least one restraining system as a function of a logical value of the airborne state signal.

Figure 2:
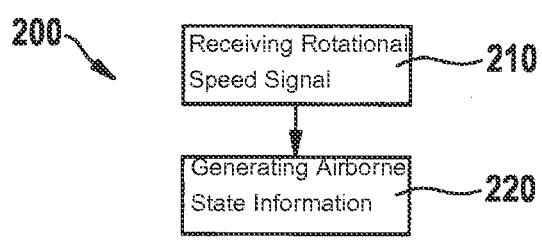
FIGS. 2 through 6 show flow charts of methods according to exemplary embodiments of the present invention.

FIG. 2 shows a flow chart of a method 200 for generating an item of information for indicating an airborne state for a vehicle, according to one exemplary embodiment of the present invention. Method 200 has a step of receiving 210 a rotational speed signal which represents a rotational speed of at least one drive wheel of the vehicle. Method 200 also has a step of generating 220 the information for indicating an airborne state based on a comparison of a profile of the rotational speed signal with at least one reference profile for the rotational speed signal. Method 200 may be advantageously carried out in connection with a device for generating information for indicating an airborne state and for detecting an airborne state of a vehicle such as the device from FIG. 1, more specifically, a generation device such as the generation device from FIG. 1 or a device for indicating an airborne state such as the first device for indicating an airborne state from FIG. 1.

In other words, detection of an airborne state of a vehicle is thus made possible via the torque or the rotational speed of one or multiple drive wheels. At the start of a vehicle airborne state, the drive wheels will leave the ground. This results in two options for a time-based profile of the rotational speed of the drive wheels during the transition into the airborne state. In the first option, given the same torque requirement by a driver, the wheel rotational speed will increase more strongly than in normal operation of the vehicle, since there is no longer any road friction. In the second option, given an increase or decrease of the torque requirement by the driver, the wheel rotational speed will increase more strongly or decrease more slowly than in situations without an airborne state, since there is no longer any road friction. This difference in the wheel rotational speed in the airborne state of the vehicle in comparison to the rotational speed in vehicles on the road which is calculated, expected or modeled via the static friction of the road as a reference profile may be measured, and an airborne situation may thus be detected early.

Figure 3:
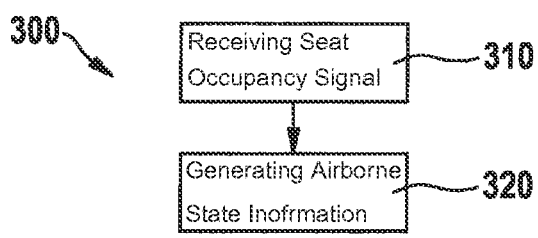

FIG. 3 shows a flow chart of a method 300 for generating an item of information for indicating an airborne state for a vehicle, according to one exemplary embodiment of the present invention. Method 300 has a step of receiving 310 a seat occupancy signal which represents a seat occupancy of at least one seat of the vehicle. Method 300 also has a step of generating 320 the information for indicating an airborne state based on a comparison of a profile of the seat occupancy signal with at least one reference profile for the seat occupancy signal. Method 300 may be advantageously carried out in connection with a device for generating information for indicating an airborne state and for detecting an airborne state of a vehicle such as the device from FIG. 1, more specifically, a generation device such as the generation device from FIG. 1 or a device for indicating an airborne state such as the second device for indicating an airborne state from FIG. 1.

In other words, detection of an airborne state of a vehicle via a weight signal of a seat occupancy sensor is made possible. If a vehicle is in the airborne state, no forces other than gravity are exerted on the vehicle and its occupants. It follows that no counterforce from the vehicle acts on the occupants, as is the case with a vehicle on the road. In the case of an airborne state, a seat occupancy sensor will detect no weight force of the occupant. This may be used for detecting an airborne state.

Figure 4:
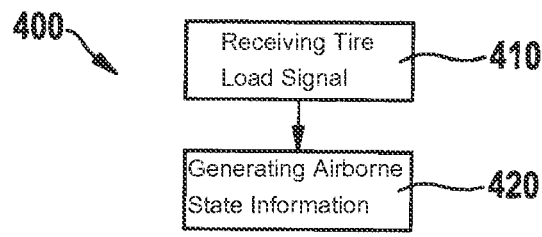

FIG. 4 shows a flow chart of a method 400 for generating an item of information for indicating an airborne state for a vehicle, according to one exemplary embodiment of the present invention. Method 400 has a step of receiving 410 a tire load signal which represents a tire load of at least one tire of the vehicle. Method 400 also has a step of generating 420 the information for indicating an airborne state based on a comparison of a profile of the tire load signal with at least one reference profile for the tire load signal. Method 400 may be advantageously carried out in connection with a device for generating information for indicating an airborne state and for detecting an airborne state of a vehicle such as the device from FIG. 1, more specifically, a generation device such as the generation device from FIG. 1 or a device for indicating an airborne state such as the third device for indicating an airborne state from FIG. 1.

In other words, detection of an airborne state of a vehicle may thus be made possible via the tire pressure. The speed and tread of the tire on the road may be detected via the radial acceleration of a sensor on the tire, and the tire load may then be ascertained with the aid of the tire pressure. This tire load thus ascertained may be used for the detection of an airborne state, since no load acts on the tires in the airborne state.

Figure 5:
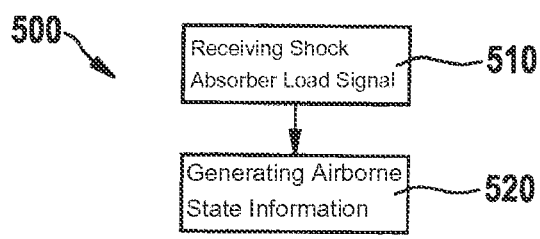

FIG. 5 shows a flow chart of a method 500 for generating an item of information for indicating an airborne state for a vehicle, according to one exemplary embodiment of the present invention. Method 500 has a step of receiving 510 a shock absorber load signal which represents a shock absorber load of at least one shock absorber of the vehicle. Method 500 also has a step of generating 520 the information for indicating an airborne state based on a comparison of a profile of the shock absorber load signal with at least one reference profile for the shock absorber load signal. Method 500 may be advantageously carried out in connection with a device for generating information for indicating an airborne state and for detecting an airborne state of a vehicle such as the device from FIG. 1, more specifically, a generation device such as the generation device from FIG. 1 or a device for indicating an airborne state such as the fourth device for indicating an airborne state from FIG. 1.

In other words, detection of an airborne state of a vehicle via the shock absorption or light adjustment sensors is made possible. Light adjustment functions use shock absorption sensors in order to detect the load of the vehicle and thus to adjust the headlights to the correct height. The same signals for shock absorber load detection may also be used for detecting an airborne state, since no load acts on the shock absorbers in the airborne state.

Figure 6:
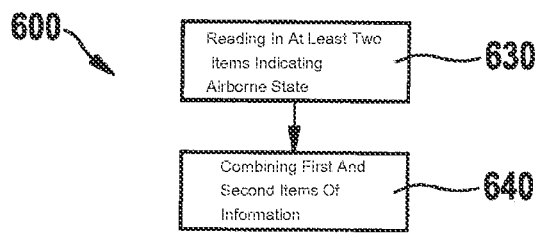

FIG. 6 shows a flow chart of a method 600 for detecting an airborne state of a vehicle, according to one exemplary embodiment of the present invention. Method 600 has a step of reading in 630 at least two items of information for indicating an airborne state which are generated according to at least two of the methods from FIGS. 2 through 5. Method 600 also has a step of combining a first item of information for indicating an airborne state which is generated according to one of the methods from FIGS. 2 through 5 with at least one second item of information for indicating an airborne state which is generated according to one of the methods from FIGS. 2 through 5, in order to generate an airborne state signal which represents detection of the airborne state of the vehicle. Method 600 may be advantageously carried out in connection with a device for generating information for indicating an airborne state and for detecting an airborne state of a vehicle such as the device from FIG. 1, more specifically, a combiner such as the combiner from FIG. 1.

Figure 7:
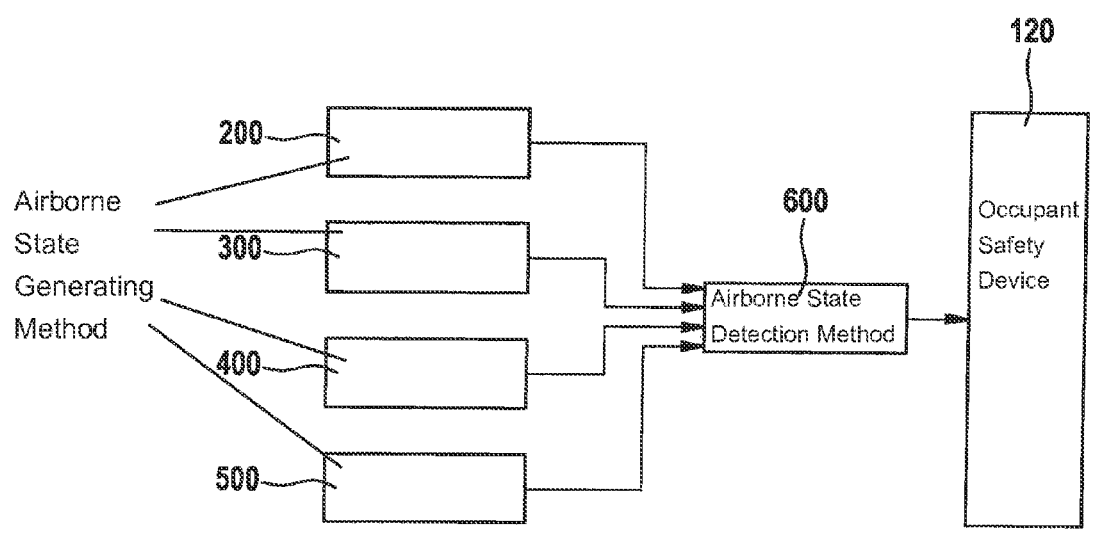
FIG. 7 shows a schematic overview of methods according to exemplary embodiments of the present invention.

FIG. 7 shows a schematic overview of methods for controlling an occupant safety device as shown, for example, in FIG. 1, according to exemplary embodiments of the present invention. The following are shown: method 200 for generating an item of information for indicating an airborne state for a vehicle based on a rotational speed signal from FIG. 2, method 300 for generating an item of information for indicating an airborne state for a vehicle based on a seat occupancy signal from FIG. 3, method 400 for generating an item of information for indicating an airborne state for a vehicle based on a tire load signal from FIG. 4, method 500 for generating an item of information for indicating an airborne state for a vehicle based on a shock absorber load signal from FIG. 6, and method 600 for detecting an airborne state of a vehicle from FIG. 6. FIG. 7 illustrates an overview of an interaction of methods 200, 300, 400, 500, 600, as is possible in connection with the device from FIG. 1. Thus, at least two items of information for indicating an airborne state are generated with the aid of methods 200, 300, 400, 500 and provided to method 600. The airborne state signal is ascertained from the at least two items of information for indicating an airborne state with the aid of method 600, and is output to occupant safety device 120 for controlling occupant safety device 120.

Detection of the situation of a vehicle in the airborne state according to the exemplary embodiments from FIGS. 1 through 7 for adaptive control of restraint systems in the vehicle is thus made possible. This may be carried out with the aid of the aforementioned detection options for airborne situations, i.e., torque or rotational speed, driver weight or the weight signal of a seat occupancy sensor, tire pressure or tire load, and shock absorber load or light adjustment sensors.

The exemplary embodiments described and shown in the figures are selected only by way of example. Different exemplary embodiments may be combined completely or with respect to individual features. An exemplary embodiment may also be supplemented through features of an additional exemplary embodiment. Method steps according to the present invention may furthermore be repeated and executed in a sequence other than the one described.

What is claimed is:

1. A computer-implemented method, comprising:
generating, by a sensor arrangement, an electronic rotational speed signal, which represents a rotational speed of at least one drive wheel of a vehicle;
receiving, by a processor, the electronic rotational speed signal from the sensor arrangement;
generating, by the processor, a first electronic item of information indicating an airborne state of a vehicle (a) based on a comparison of a profile of the rotational speed signal with at least one reference profile for the rotational speed signal, and (b) without determining an acceleration of the vehicle;
receiving, by the processor, a further signal;
generating, by the processor, a second item of information for indicating the airborne state based on a comparison of a profile of the further signal with at least one reference profile for the further signal, the further signal indicating that fewer of particular components act on a structure of the vehicle compared with the at least one reference profile for the further signal; and
combining, by the processor, the further signal for indicating the airborne state with the first electronic item of information for indicating the airborne state in order to generate an airborne state signal;
wherein:
(a) the structure of the vehicle is at least one seat of the vehicle, the further signal is a seat occupancy signal that represents a seat occupancy of the at least one seat, and the particular components are forces other than gravity;
(b) the structure of the vehicle is at least one tire of the vehicle, the further signal is a tire load signal that represents a tire load of the at least one tire, and the particular components are loads; or
(c) the structure of the vehicle is at least one shock absorber of the vehicle, the further signal is a shock absorber load signal that represents a shock absorber load of the at least one shock absorber, and the particular components are loads.

2. The method as recited in claim 1, further comprising:
receiving an additional item of information for indicating the airborne state which is based on a value from at least one acceleration sensor of the vehicle; and
combining the additional item of information for indicating the airborne state with the first electronic item of information for indicating the airborne state in order to generate an airborne state signal.

3. The method as recited in claim 1, further comprising:
receiving an additional item of information for indicating the airborne state which is based on a value from at least one acceleration sensor of the vehicle; and
carrying out one of (1) a first plausibility check of an airborne state signal using the additional item of information for indicating the airborne state and (2) a second plausibility check of the additional item of information for indicating the airborne state using the additional item of information.

4. The method according to claim 1, further comprising outputting an airborne state signal to an interface to at least one occupant safety device.

5. The method as recited in claim 1, wherein the electronic rotational speed signal indicates a wheel rotational speed positive acceleration that is more rapid than that indicated by the at least one reference profile.

6. The method as recited in claim 1, wherein the electronic rotational speed signal indicates a wheel rotational speed deceleration that is slower than that indicated by the at least one reference profile.

7. The method as recited in claim 1, wherein the further signal is the seat occupancy signal, the structure of the vehicle is the at least one seat of the vehicle, and the particular components are the forces other than gravity.

8. The method as recited in claim 7, wherein the seat occupancy signal indicates that no forces other than gravity acts on the at least one seat.

9. The method as recited in claim 1, wherein the further signal is the tire load signal, the structure of the vehicle is the at least one tire of the vehicle, and the particular components are the loads that act on the at least one tire.

10. The method as recited in claim 9, wherein the tire load signal indicates that no load acts on the at least one tire.

11. The method as recited in claim 9, wherein the tire load is determined based on a radial acceleration measured by a sensor on the at least one tire.

12. The method as recited in claim 1, wherein the further signal is the shock absorber load signal, the structure of the vehicle is the at least one shock absorber of the vehicle, and the particular components are the loads that act on the at least one shock absorber.

13. The method as recited in claim 12, wherein the shock absorber load signal indicates that no load acts on the at least one shock absorber.

14. The method as recited in claim 13, wherein the shock absorber load signal includes a light adjustment sensor that adjusts a light to a height based on a detected load of the vehicle.

15. A computer-implemented method, comprising:
receiving, by a processor, an electronic signal; and
generating, by the processor, an electronic item of information for indicating an airborne state for a vehicle based on a comparison of a profile of the electronic signal with at least one reference profile for the electronic signal, the electronic signal indicating that fewer of particular components act on a structure of the vehicle compared with the at least one reference profile for the electronic signal;

wherein:
(a) the structure of the vehicle is at least one seat of the vehicle, the electronic signal is a seat occupancy signal that represents a seat occupancy of the at least one seat, and the particular components are forces other than gravity;
(b) the structure of the vehicle is at least one tire of the vehicle, the electronic signal is a tire load signal that represents a tire load of the at least one tire, and the particular components are loads; or
(c) the structure of the vehicle is at least one shock absorber of the vehicle, the electronic signal is a shock absorber load signal that represents a shock absorber load of the at least one shock absorber, and the particular components are loads.

16. The method as recited in claim 15, wherein the electronic signal is the seat occupancy signal, the structure of the vehicle is the at least one seat of the vehicle, and the particular components are the forces other than gravity.

17. The method as recited in claim 15, wherein the electronic signal is the tire load signal, the structure of the vehicle is the at least one tire of the vehicle, and the particular components are the loads that act on the at least one tire.

18. The method as recited in claim 15, wherein the electronic signal is the shock absorber load signal, the structure of the vehicle is the at least one shock absorber of the vehicle, and the particular components are the loads that act on the at least one shock absorber.

19. A device for generating a first item of information and a second item of information, for indicating an airborne state for a vehicle, comprising:
a sensor arrangement; and
processing circuitry communicatively coupled to the sensor arrangement, wherein the processing circuitry is configured to:
receive from the sensor arrangement a rotational speed signal which represents a rotational speed of at least one drive wheel of the vehicle and a further signal;
generate the first item of information for indicating the airborne state (a) based on a comparison of a profile of the rotational speed signal with at least one reference profile for the rotational speed signal, and (b) without determining an acceleration of the vehicle;
receive from the sensor arrangement a further signal;
generate a second item of information for indicating the airborne state based on a comparison of a profile of the further signal with at least one reference profile for the further signal, the further signal indicating that fewer of particular components act on a structure of the vehicle compared with the at least one reference profile for the further signal; and
combine the further signal for indicating the airborne state with the first electronic item of information for indicating the airborne state in order to generate an airborne state signal;
wherein:
(a) the structure of the vehicle is at least one seat of the vehicle, the further signal is a seat occupancy signal that represents a seat occupancy of the at least one seat, and the particular components are forces other than gravity;
(b) the structure of the vehicle is at least one tire of the vehicle, the further signal is a tire load signal that represents a tire load of the at least one tire, and the particular components are loads; or
(c) the structure of the vehicle is at least one shock absorber of the vehicle, the further signal is a shock absorber load signal that represents a shock absorber load of the at least one shock absorber, and the particular components are loads.

20. A computer program product having program code for execution on a device for carrying out a method for generating a first item of information and a second item of information, for indicating an airborne state for a vehicle, comprising:

receiving a rotational speed signal which represents a rotational speed of at least one drive wheel of the vehicle and a seat occupancy signal which represents a seat occupancy of at least one seat of the vehicle;

generating the first item of information for indicating the airborne state (a) based on a comparison of a profile of the rotational speed signal with at least one reference profile for the rotational speed signal, and (b) without determining an acceleration of the vehicle;

receiving a further signal;

generating a second item of information for indicating the airborne state based on a comparison of a profile of the further signal with at least one reference profile for the further signal, the further signal indicating that fewer of particular components act on a structure of the vehicle compared with the at least one reference profile for the further signal; and combining the further signal for indicating the airborne state with the first electronic item of information for indicating the airborne state in order to generate an airborne state signal;

wherein:
   (a) the structure of the vehicle is at least one seat of the vehicle, the further signal is a seat occupancy signal that represents a seat occupancy of the at least one seat, and the particular components are forces other than gravity;
   (b) the structure of the vehicle is at least one tire of the vehicle, the further signal is a tire load signal that represents a tire load of the at least one tire, and the particular components are loads; or
   (c) the structure of the vehicle is at least one shock absorber of the vehicle, the further signal is a shock absorber load signal that represents a shock absorber load of the at least one shock absorber, and the particular components are loads.

* * * * *